Patented Dec. 4, 1951

2,577,719

UNITED STATES PATENT OFFICE 2,577,719

LUBRICATING COMPOSITIONS CONTAINING DICARBOALKOXY-DIHEPTADECYL SELENIDES

William T. Stewart, Berkeley, Calif., assignor to California Research Corporation, San Francisco, Calif., a corporation of Delaware No Drawing. Application May 23, 1950,
Serial No. 163,793

5 Claims. (Cl. 252—48.6)

This invention relates to hydrocarbon lubricating oils and the like containing selenium compounds.

Certain selenium compounds are known to be potent anti-oxidants when incorporated in small amount in mineral lubricating oils and the like. Thus, as described in Denison and Condit, United States Patent No. 2,398,415, issued April 16, 1946, aliphatic selenides and diselenides containing 8 or more carbon atoms in at least one of the aliphatic groups attached to selenium, and more particularly the dialkyl selenides and diselenides containing 8 or more carbon atoms in each alkyl radical, are highly effective anti-oxidants and corrosion inhibitors well suited to inhibit oxidation of and corrosion of copper-lead and similar bearing-type alloys by mineral lubricating oils. These selnium compounds are much more effective in these and other respects than sulfur compounds heretofore used for similar purposes.

It is an object of the present invention to provide other new and useful compounds of selenium capable of improving hydrocarbon oils and other oxidizable organic substances.

It is a further object of the invention to provide compositions of matter including an oxidizable base, such, for example, as a hydrocarbon lubricating oil, and a small amount of a selenium compound which is multi-functional, possessing the anti-oxidant and anti-corrosive properties of the above mentioned aliphatic selenides and possessing other properties not possessed by or not possessed in as high degree by the above mentioned aliphatic selenides.

These and other objects of the invention will be apparent from the following description and the appended claims.

In accordance with the invention, there is incorporated in an oxidizable base substance a small amount of certain selenium containing aliphatic dicarboxylic acid esters. These compounds may be prepared by treating an unsaturated $C_{16}$ to $C_{24}$ fatty acid ester containing the unsaturated group removed to at least the 5:6 position from the carboxy group, with hydrogen halide to form a halogenated ester and condensing the halogenated ester with sodium selenide, sodium diselenide or other suitable metal selenide, to produce a dicarboxy ester seleno compound. These compounds may be prepared by first halogenating the unsaturated acid, condensing with the selenide, and thereafter esterifying.

Those additives prepared from fatty acids, such as oleic acid, having the unsaturated group far removed from the carboxyl group in the 6,7-position from the carboxyl group are preferred to those additives prepared from fatty acids having the unsaturated group closer to the carboxyl group.

Also within the scope of the invention are concentrates or stock solutions in hydrocarbon oil of these selenium compounds, more fully described hereinbelow, suitable for blending with further quantities of oil to produce a finished product.

The additives of the invention are, therefore, dicarboxylic acid esters of the formula

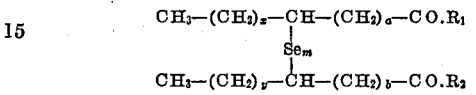

wherein $R_1$ and $R_2$ are lower molecular weight ether radicals of less than about 9 carbon atoms (preferably 1 to 5 carbon atoms) and preferably alkoxyl groups, $m$ is 1 or 2, $x$, $y$, $a$ and $b$ are whole numbers not less than unity, $a$ and $b$ are each 4 to 9, and $x+a+2$ and $y+b+2$ each has a value of 16 to 24.

The additives of the invention can be prepared by the following reactions, in which the starting materials and end products are illustrative:

(1)

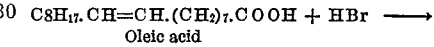

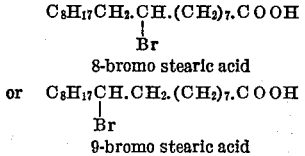

(It is not known which of the isomers, 8-bromo and 9-bromo stearic acids, is formed, or whether the product is a mixture of the two. For simplicity, it will be assumed that the 8-bromo isomer is formed, it being understood that the 9-bromo isomer or a mixture of the two isomers may be formed.)

(2)

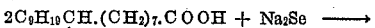

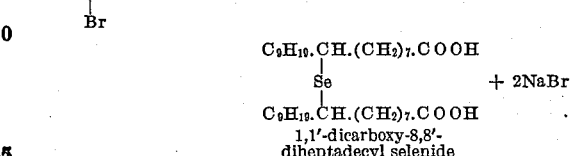

(3)

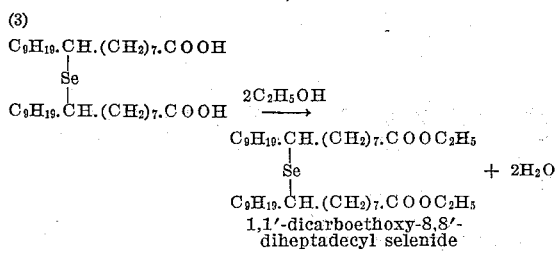

Similarly, the ester can be prepared by hydrobrominating oleic acid, esterifying and condensing with sodium selenide; and by substituting other selenium or tellurium salts for sodium selenide, or other unsaturated fatty acids for oleic acid, or using other ester-forming materials, still other compounds of the invention can be prepared.

The following specific examples will serve to illustrate the preparation and properties of the additive compounds of the invention and their employment as lubricant additives and the like.

*Example 1.—Preparation of ethyl ester of 1,1'dicarboxy-8,8'- (or -9,9'-) diheptadecyl selenide.*—Oleic acid was reacted with anhydrous hydrogen bromide in glacial acetic acid to yield 9- or 10-bromostearic acid, as described by Piotrowski, Berichte der deutschen chemischen Gesellschaft, 23, 2532. The brominated stearic acid was converted to its sodium salt with sodium hydroxide and reacted with the calculated amount of sodium selenide in refluxing ethyl alcohol. Acidification of the reaction mixture gave the desired 1,1'-dicarboxy 8,8'- or 9,9'diheptadecyl selenide in substantially quantitative yield. Analysis: theoretical, Se=12.2%; found 12.2%. This substance was found to have a melting point of about 19° C., a refractive index $(n_D^{20})$ of 1.4751 and a density (20° C./4° C.) of 0.9842.

A mixture of 1,1'-dicarboxy-8,8'- or 9,9'-diheptadecyl selenide and excess ethyl alcohol was refluxed in the presence of anhydrous hydrogen chloride. A quantitative yield of 1,1'-dicarboethoxy-8,8' or 9,9'-diheptadecyl selenide was obtained by washing out excess alcohol and catalyst from the reaction product. Analysis: theoretical, Se=11.3%, found 10.6%. This substance was found to have a melting point of about −10° C., a refractive index $(n_D^{20})$ of 1.4751 and a density (20° C./4° C.) of 0.9842.

*Example 2.—Preparation of various esters of 1,1'-dicarboxy-8,8'- (or 9,9'-) diheptadecyl selenide.*—The procedure described in Example 1 was repeated to obtain 1,1'-dicarboxy 8,8'- or 9,9'-heptadecyl selenide having a selenium content of 12.0% by analysis and therefrom the following esters:

1,1'-dicarbomethoxy-8,8' or 9,9'-diheptadecyl selenide;
1,1' - dicarboethoxy-8,8' or 9,9' - diheptadecyl selenide;
1,1'-dicarboisopropoxy-8,8' or 9,9'-diheptadecyl selenide; and
1,1'-dicarbopentoxy-8,8' or 9,9' - diheptadecyl selenide.

*Example 3.—Oxidation tests.*—Oxidation tests on mineral oil, taken alone and with additives of the invention, were carried out in apparatus of the type described by Dornte in Industrial and Engineering Chemistry, vol. 28, page 26 (1936). Oxygen at atmospheric pressure was passed through the oil maintained at 340° F., fine fritted-glass filter being employed in the bottom of the absorption cell to disperse the gas stream into very fine bubbles. The amount of oxygen absorbed was measured, and the time in hours required for 100 grams of oil to absorb 1200 cc. of oxygen (S. T. P.), called the "induction period," was noted. The base oil employed was a medicinal grade of white oil. Selenium additives were used in such amounts in each case so that the compounded oils contained 0.019% selenium. Induction periods of base oil and inhibited oils containing the compounds of Examples 1 and 2 were as follows:

*Table I*

| Oil | Induction Period |
|---|---|
| | *Hours* |
| Base Oil | 0.1 |
| Base Oil + 0.17% 1,1'-Dicarboethoxy-8,8'- or 9,9'-diheptadecyl selenide | { 3.1 <br> 3.4 |

*Example 4.—Oxidation tests.*—Another oxidation test was carried out in an apparatus differing from that used in Example 3, as follows: The oxidation cell, which is connected to a manometer for pressure measurement, is constructed from glass tubing of 1¼ in. O. D. and approximately 4½ inches long with flat ends; extending from the cell is a ⅜ inch O. D. glass tube 8½ inches long, which serves to introduce oxygen and suspend the cell in an oil bath maintained at 340° F. During the test the cell is mechanically shaken such as by attachment to a windshield wiper drive mechanism, adjusted to give an agitation rate of about 120 cycles per minute. Ordinarily pieces of copper wire are placed in the cell as catalyst, but in these tests none was used. After the test sample is introduced into the cell and the system reaches temperature, oxygen is introduced to one atmosphere pressure. By means of the manometer, the time at which a rapid pressure drop takes place determines the "induction period." For a white oil solution of 0.143% of 1,1'-dicarboethoxy-8,8'- or 9,9'-diheptadecyl sulfide prepared in a manner analogous to Example 1, the induction period obtained by the above-described method was 0.1 hr. Since the results so obtained are directly comparable to those obtained in Example 3, the above sulfur compound shows no apparent modification of the oxidative deterioration of said oil and thus would be unsatisfactory as an antioxidant.

On comparing the above result of 0.1 hr. induction period for 1,1'-dicarboethoxy-8,8'- or 9,9'-diheptadecyl sulfide with the induction period of 3.1–3.4 for 1,1'-dicarboethoxy-8,8'- or 9,9'-diheptadecyl selenide as shown in Table I, it is seen that the sulfur compound has no apparent inhibiting effect on oxidative deterioration, whereas the selenium compound is a highly effective oxidation inhibitor.

*Example 5.—Oxidation tests.*—Another series of tests were carried out in an apparatus which differs in the following respects from that employed in Example 3: The oxidation cell is constructed of a large glass test tube with a head portion having a connection for introducing oxygen, an annular space surrounding the upper end of the tube, and a fitting for a removable high-speed glass stirrer. The annular space contains potassium hydroxide pellets for removal of water, carbon dioxide, volatile aldehydes, etc. The lower portion of the cell which contains the test sample is immersed in an oil bath at 340° F. During the test, the oil sample is rapidly agitated by means of the high speed stirrer and is kept under a pressure of one atmosphere of pure oxygen, the volume of oxygen added being automatically recorded. In these series of tests, the induction period was taken as the time required for the sample to absorb about 1000 cc. of oxygen (S. T. P.), which for the test oils is the point at which they rapidly absorb oxygen.

The construction of the oxidation cell described above permits careful cleaning of the cell to free it of all traces of catalyst which might mask slight inhibiting effects of certain compounds. In contrast the cells used in the apparatus of Examples 3 and 4 are more difficult to clean and traces of catalyst remaining after cleaning tend to cause the induction period values to be lower, particularly for agents slightly effective as inhibitors. Thus, very weak inhibiting agents that are sensitive to traces of catalyst will show slight values of up to about 1 hr. in the present test and in the tests of Examples 3 and 4 values of about 0.1 hr.

Table II gives the induction periods obtained by the method just described for base oils and oil inhibited with the selenium compounds of Example 2 as well as oils inhibited with analogous sulfur compounds prepared by a procedure analogous to that described in Example 2, white oil being used as base oil:

| Oil | Induction Period |
| --- | --- |
|  | Hours |
| Base Oil | 0.1 |
| Base Oil+0.163% of 1,1'-Dicarbomethoxy-8,8'- or 9,9'-diheptadecyl selenide | 5.1 |
| Base Oil+0.169% of 1,1'-Dicarboethoxy-8,8'- or 9,9'-diheptadecyl selenide | 5.4 |
| Base Oil+0.178% of 1,1'-Dicarboisopropoxy-8,8'- or 9,9'-diheptadecyl selenide | 6.4 |
| Base Oil+0.188% of 1,1'-Dicarbopentoxy-8,8'- or 9,9'-diheptadecyl selenide | 4.2 |
| Base Oil+0.151% of 1,1-Dicarbomethoxy-8,8'- or 9,9'-diheptadecyl sulfide | 0.9 |
| Base Oil+0.157% of 1,1'-Dicarboethoxy-8,8'- or 9,9'-diheptadecyl sulfide | 1.1 |
| Base Oil+0.177% of 1,1'-Dicarbopentoxy-8,8'- or 9,9'-diheptadecyl sulfide | 0.7 |

From these data it is clearly seen that the sulfur compounds, in the absence of the slightest traces of catalyst or extraneous matter or oxidation products such as water and aldehydes, give a slight inhibiting effect, but that the selenium compounds are far superior. Thus, the selenium compounds give induction periods about five times as long, which is a large improvement and of great significance in inhibition of oxidative deterioration.

*Example 6.—Engine tests.*—Oils of the invention were submitted to engine tests, with results as given in Table III below. The engine used was a Wisconsin engine (a single cylinder, air-cooled, 2½" bore, 2¾" stroke, gasoline engine) and was operated under the following conditions: rear of cylinder temperature, 600° F.; oil sump temperature, 325° F.; speed, 1800 R. P. M. The oil tested was used as the crankcase lubricant in the test.

Piston discoloration No. (P. D. No.) denotes the amount of discoloration of piston walls, etc. A completely clean piston rates a P. D. No. of zero; a completely blackened piston, a P. D. No. of 800. Further refinements were employed in calculating P. D. Nos. The P. D. Nos. were determined after 30 hours' operation and again after 60 hours' operation.

*Table III*

| Oil Used | Piston Discoloration No. | |
| --- | --- | --- |
|  | 30 hrs. | 60 hrs. |
| Base Oil+16 mM./kg. Ba meta-cetoxy phenate +1.5% 1,1'-dicarboethoxy-8,8'- (or 9,9'-) dipentadecyl selenide | 185 | 240 |

The proportions of the various salts is expressed in Table III as "mM/kg." of metal, meaning millimols of metal per kilogram of oil; e. g., "16mM/kg." Ba meta-cetoxy phenate means 0.016 gram mol barium (in the form of barium meta-cetoxy phenate) per kilogram of oil.

The selenium compounds of the invention may be used as the sole or only improving agents for mineral lubricating oils and the like or they may be used in conjunction with other additives. Advantageously, where used in motor lubricating oils, they are used in conjunction with metal salt additives, such as phenates, organo phosphates, organo thiophosphates and organo sulfonates. Examples of suitable phenates are calcium amyl and cetyl phenates, sulfurized calcium cetyl phenate such as described in Etzler and Farrington, U. S. Patent No. 2,360,302 (see, for example, Table I on page 3), and barium diamyl diphenol sulfides and disulfides. Examples of suitable phosphates and thiophosphates are calcium and zinc cetyl phosphates, cetyl thiophosphates, cetylphenyl thiophosphates and methylcyclohexyl thiophosphates (see Farrington et al. U. S. Patent No. 2,228,659, Rutherford et al. No. 2,252,984 and Asseff No. 2,261,047 for examples of suitable phosphates and thiophosphates). Examples of suitable sulfonates are calcium and barium mahogany sulfonates and calcium and barium salts of alkylaryl sulfonic acids such as produced by alkylating benzene with cetyl chloride, chlorinated kerosene or chlorinated white oil and sulfonating the alkylation product.

The selenium compounds of the invention may be used in finished oils and the like in amounts of 0.1 to 2%, preferably 0.5 to 1.5%, by weight based on finished oil.

Concentrates or stock solutions of additives of the present invention in hydrocarbon lubricating oil may also be prepared, containing, say, 2 to 25% of additive. These concentrates or stock solutions are useful for blending with further quantities of oil or other oxidizable organic substance, to produce a finished product.

The metal salt additives mentioned above and exemplified by phenates, phosphates, thiophosphates and sulfonates, may be used in similar amounts, i. e., 0.1 to 2% by weight, or 1 to 30 mM./kg. of metal, in finished products, or 2 to 25% in concentrates.

Besides mineral lubricating oils (which may be of paraffinic, naphthenic or mixed base stocks ranging in viscosity from spindle oils to heavy cylinder stocks) the selenium additives of the invention may also be used to stabilize other oxidizable organic materials against oxidation and to confer other benefits. Thus, they may be used in kerosene, polypropylene, polybutenes, mineral oil-soap greases, synthetic resins, lubricating oils derived from coal products, etc., as well as synthetic lubricating oils, for example, polyalkylene ether alcohols and derivatives thereof such as ethers and esters of polyalkylene ether alcohols, e. g., a butanol (or other alcohol)-initiated polymer of propylene oxide, which hydroxycontaining polymer is esterified with acetic acid (or other acid), polyesters such as esters of aliphatic dibasic acids, e. g., di-2-ethyl-hexyl sebacate, and the like, particularly those oils having hydrocarbon groups susceptible to oxidation under conditions encountered in lubrication.

Further examples of suitable selenium compounds of the invention are the dicarboxy dialkyl selenides and diselenides prepared by adding hydrogen bromide or other suitable hydrogen halide to the double bond of elaidic, erucic, rapic, lauroleic, palmitolenic or hyristoleic acid, condensing the resulting halo acid with sodium selenide, sodium diselenide or other suitable metal selenide, and converting the resulting seleno acids to the esters with lower molecular weight alcohols such as methyl, ethyl, propyl, isopropyl, butyl, amyl, hexyl, heptyl and octyl alcohols.

This application is a continuation-in-part of my co-pending applications Serial Nos. 676,108 and 676,109, filed June 11, 1946, the latter being now abandoned.

Wherever the phrase "consisting essentially" is used in the claims, it means that the composition is made up almost entirely of the ingredients recited and these ingredients are the main and characterizing ones, but this expression does not exclude the presence of minor amounts of other ingredients which are commonly employed in lubricating compositions or which would not change the essential character of the composition.

I claim:

1. A lubricant comprising a major proportion of a hydrocarbon oil and 0.1 to 2% by weight based on finished oil of 1,1'-dicarboalkoxy heptadecyl selenide additive selected from the group consisting of 1,1'-dicarboalkoxy-8,8'-heptadecyl selenide; 1,1'-dicarboalkoxy-9,9'-heptadecyl selenide; and mixtures thereof, wherein the alkoxy groups have not more than 8 carbon atoms.

2. The lubricant of claim 1, wherein said alkoxy groups are methoxy groups.

3. The lubricant of claim 1, wherein said alkoxy groups are ethoxy groups.

4. The lubricant of claim 1, wherein said alkoxy groups are isopropoxy groups.

5. The lubricant of claim 1, wherein said alkoxy groups are pentoxy groups.

WILLIAM T. STEWART.

REFERENCES CITED

The following references are of record in the file of this patent:

UNITED STATES PATENTS

| Number | Name | Date |
|---|---|---|
| 2,317,666 | Burwell et al. | Apr. 27, 1943 |
| 2,398,202 | Zublin et al. | Apr. 9, 1946 |